(12) United States Patent
Sauvageau

(10) Patent No.: US 6,847,363 B1
(45) Date of Patent: Jan. 25, 2005

(54) METHOD AND APPARATUS FOR DRAWING LINE GRAPHS

(75) Inventor: Yvon Sauvageau, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 55 days.

(21) Appl. No.: 10/440,217

(22) Filed: May 15, 2003

(51) Int. Cl.[7] .............................................. G06T 11/20
(52) U.S. Cl. ..................................... 345/443; 345/441
(58) Field of Search ................................ 345/440, 441, 345/442, 443

(56) References Cited

U.S. PATENT DOCUMENTS 4,951,227 A * 8/1990 Todd .......................... 345/441
6,091,424 A 7/2000 Madden et al.

OTHER PUBLICATIONS

Giuseppe Di Battista, et al., "Graph Drawing, Algorithms for the Visualization of Graphs," Chapter 7, 1999, Prentice Hall, pp. 215–238.

Ulrik Brandes, et al., "A Bayesian Paradigma for Dynamic Graph Layout," 1997, Universität Konstanz, pp. 1–11.

Stephan Diehl, et al., "Preserving the Mental Map using Foresighted Layout," Proceedings of the Joint Eurographics–IEEE TVCG Symposium on Visualization, VisSym 2001, pp. 175–184.

* cited by examiner

Primary Examiner—Matthew Luu
(74) Attorney, Agent, or Firm—Hickman Palermo Truong & Becker LLP

(57) ABSTRACT

An approach for drawing a straight-line graph with minimal cognitive disruption to the user is disclosed. In one embodiment, information defining a first graph comprising a first vertex set and a first edge set is received. A second vertex set and a second edge set are received. The second edge set is added to the first edge set. A second graph is created based on the first vertex set and the first edge set. For each vertex in the second vertex set, one or more neighboring vertices are determined, a first barycenter is determined based on positions of the neighboring vertices in the second graph, a second barycenter is determined based on positions of the neighboring vertices in the first graph, and a vector directed from the first barycenter to the vertex in the second graph is determined. Coordinates of the vertex in the first graph are modified to a final position equal to a sum of the vector and the second barycenter. The approach preserves a mental map of a viewer or user, on vertices that are added to a graph, and minimizes the cognitive need of a viewer or user to make mental or physical adjustments to the resulting layout.

58 Claims, 7 Drawing Sheets

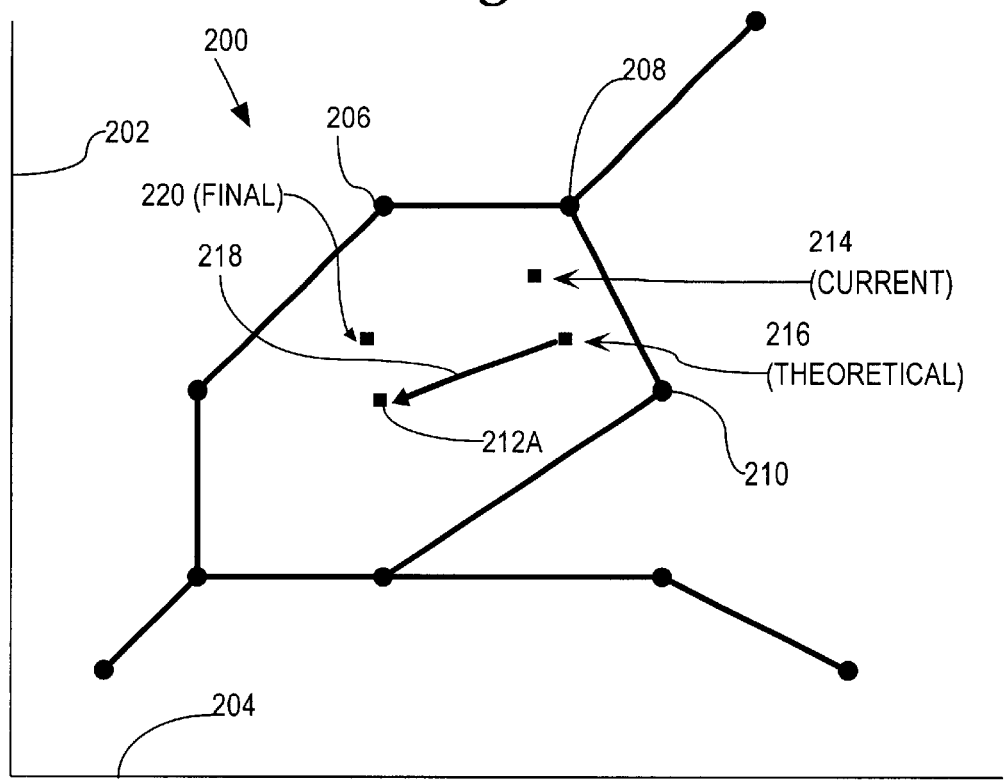

METHOD AND APPARATUS FOR DRAWING LINE GRAPHS

FIELD OF THE INVENTION

The present invention generally relates to drawing graphs, including computer graphical displays. The invention relates more specifically to a method and apparatus for drawing line graphs using incremental layout techniques that preserve a user's mental map and reduce cognitive effort.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In a straight-line drawing of a graph, each edge is drawn as a straight-line segment. In other types of drawings, a bend appears in the edges of one or more line segments; such drawings include polyline drawings, orthogonal drawings, grid drawings, etc. Straight-line drawings are used in a variety of technical contexts. One technical context pertinent to this disclosure involves the use of a straight-line drawing to represent the topology of a computer network in a graphical display generated by a network management software application or network management system (NMS).

A graph in which all relative positions of vertices are allowed may be termed a "loosely configurable" graph. Graphs that do not allow all such positions may be termed "constrained configuration" graphs.

In present approaches for straight-line graph drawing, problems arise in the context of updating and re-drawing the graph when nodes are added to the graph or removed from it. For example, assume that at some time t1, the set of vertices in a graph V is V=V1, and for each vertex v in V its coordinate in the plane is (x(v, t1), y(v, t1)). At a later time t2, both a set of vertices V2 and a set of edges E2 are added to the graph. Accordingly, the updated graph is:

G(V, E):=G(V1+V2, E1+E2).

Computer software or hardware, under program control, is used to determine new coordinate positions (x(v, t2), y(v, t2)) for each vertex v in V. However, past approaches sometimes produce results that cause cognitive disruption in viewing a redrawn graph with updated vertex positions. In particular, in certain approaches the new coordinate positions may result in drawing having lines and vertices that are not well aligned with prior coordinate positions.

The graph drawings described herein are provided for human viewing and analysis; therefore, the criteria that determine a desirable vertex repositioning are, to a great extent, psychological in nature. Thus, it is probably impossible to claim that any given repositioning is objectively better than another, but there is a need for an algorithm that produces more reasonable results than existing approaches.

This problem is addressed in the subject of chapter 7 of Di Battista et al., "Graph Drawing: algorithms for the visualization of graphs" (New Jersey: Prentice Hall, ISBN: 0-13-301615-3). The authors observe: "If an insertion or deletion operation is performed on the graph, then the new graph should be redrawn. Running any drawing algorithm on the new graph will result in a new drawing, which may be vastly different from the previous one. The user may need to spend considerable cognitive effort in trying to relate the new drawing to the previous one . . . This dramatic change destroys the user's 'mental map', that is, the mental image of the drawing . . . " Di Battista et al. state that models for the mental map, as well as some layout adjustment methods which preserve the mental map, are introduced in Misue et al., Layout adjustment and the Mental Map, J. Visual Lang. Comput., 6, no. 2, 183–210, 1995.

These issues become acute, for example, when nodes or other elements of the graph appear to "jump" in relative or absolute position after an update to the drawing. In redrawing a graph, Di Battista et al. describe four general approaches. In the "no-change scenario" approach, "the coordinates of the already placed vertices, bends and edges do not change at all . . . In this scenario, the user's mental map is strongly preserved."

Thus, there is a need for an approach that minimizes the cognitive effort needed to contemplate a new drawing in comparison to a previous one. In the specific context of network management systems, there is a need for a way to redraw straight-line graphs used for network topology displays in a manner that minimizes the cognitive effort needed to relate an updated display to a previous display.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2D is a diagram of the line graph of FIG. 2A showing positioning of the added node.

DETAILED DESCRIPTION OF THE PREFERRED EMBODIMENT

Figure 1A:
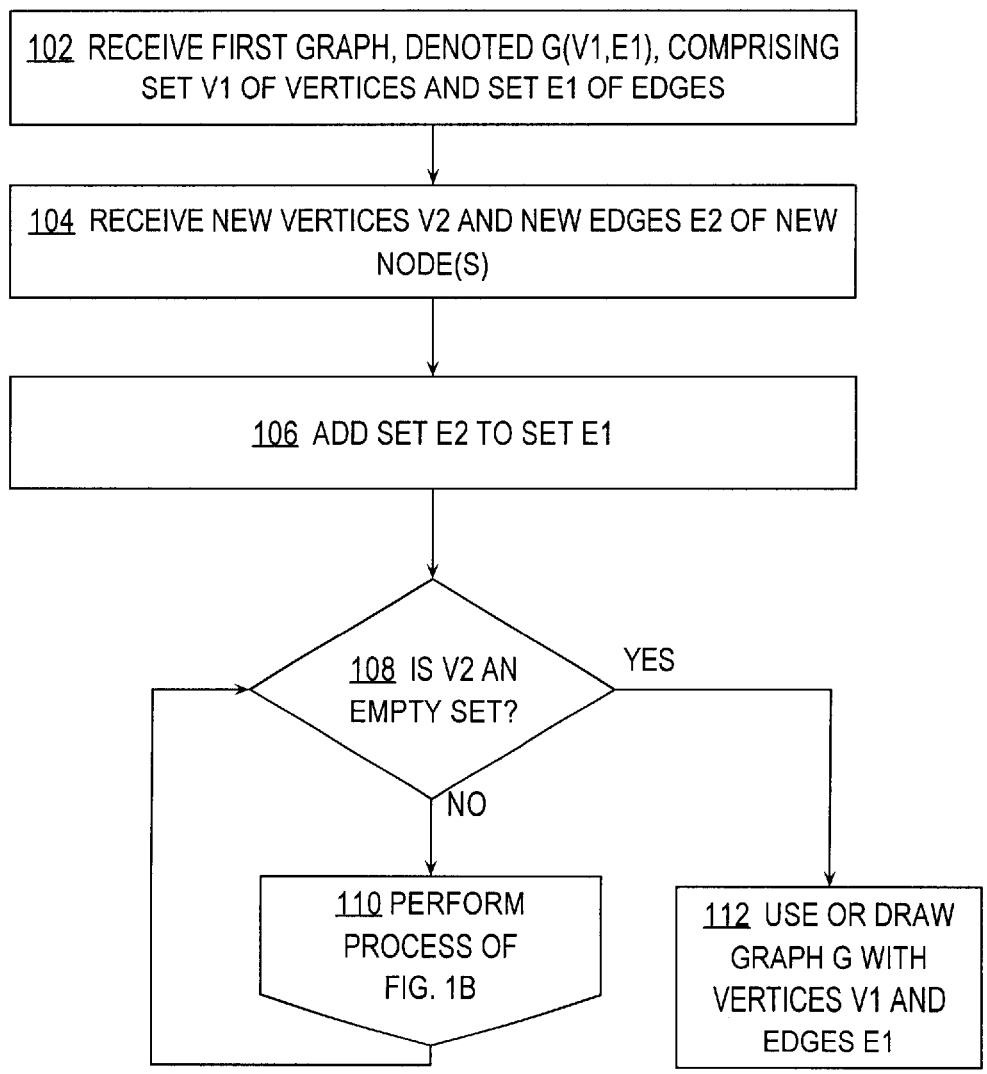
FIG. 1A is a flow diagram that illustrates one embodiment of a method of drawing a line graph using incremental layout.

A method and apparatus for drawing a line graph using incremental layout are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Approach for Drawing Straight-Line Graph
3.0 Implementation Mechanisms-Hardware Overview
4.0 Extensions and Alternatives 1.0 General Overview The needs identified in the foregoing Background, and other needs and objects that will become apparent for the following description, are achieved in the present invention, which comprises, in one aspect, a method for drawing a straight-line graph. In one embodiment, information defining a first graph comprising a first vertex set and a first edge set is received. A second vertex set and a second edge set are received. The second edge set is added to the first edge set. A second graph is created based on the first vertex set and the first edge set. The second graph is not drawn, but represents a theoretical graph layout that would result if the first graph was redrawn, with the second vertex set and second edge set added, using an existing aesthetic redrawing function. For each vertex in the second vertex set, one or more neighboring vertices are determined, a first barycenter is determined based on positions of the neighboring vertices in the second graph, a second barycenter is determined based on positions of the neighboring vertices in the first graph, and a vector directed from the first barycenter to the vertex in the second graph is determined. Coordinates of the vertex in the first graph are modified to a final position equal to a sum of the vector and the second barycenter.

In other aspects, the invention encompasses a computer apparatus and a computer-readable medium configured to carry out the foregoing steps.

The approaches herein help to preserve a mental map, of a viewer or user, on vertices that are added to a graph, and minimize the cognitive need of a viewer or user to make mental or physical adjustments to the resulting layout. The first goal may be termed "mental map criterion," and the second goal may be referred to as the "adjustment need criterion."

Certain embodiments are applicable to straight-line drawings of loosely configurable graphs. Other embodiments are useful with constrained configuration graphs.

2.0 Approach for Drawing Line Graphs

The approach herein uses a "no-change scenario" in which coordinates of already placed vertices, bends and edges do not change at all. Embodiments may be used with straight-line drawings, polyline drawings, and other kinds of drawings.

The approach herein assumes the availability of an existing function L(G), which receives a graph G(V,E) as input and repositions all vertices according to any appropriate aesthetic criteria. In a computer implementation, the aesthetic criteria are inherent in the computer code that implements the function L(G). In general, such functions are available in commercially available graph drawing software modules; in some such modules, such functions are termed "automatic layout" or "redo layout" functions. A user or program may invoke such a function to generate a new graph or layout in which the positions and appearance of all graph elements are modified. With such functions, there is no expectation of preservation of the mental map, and therefore such functions do not provide a solution to the problems addressed in the approaches herein.

Figure 1B:
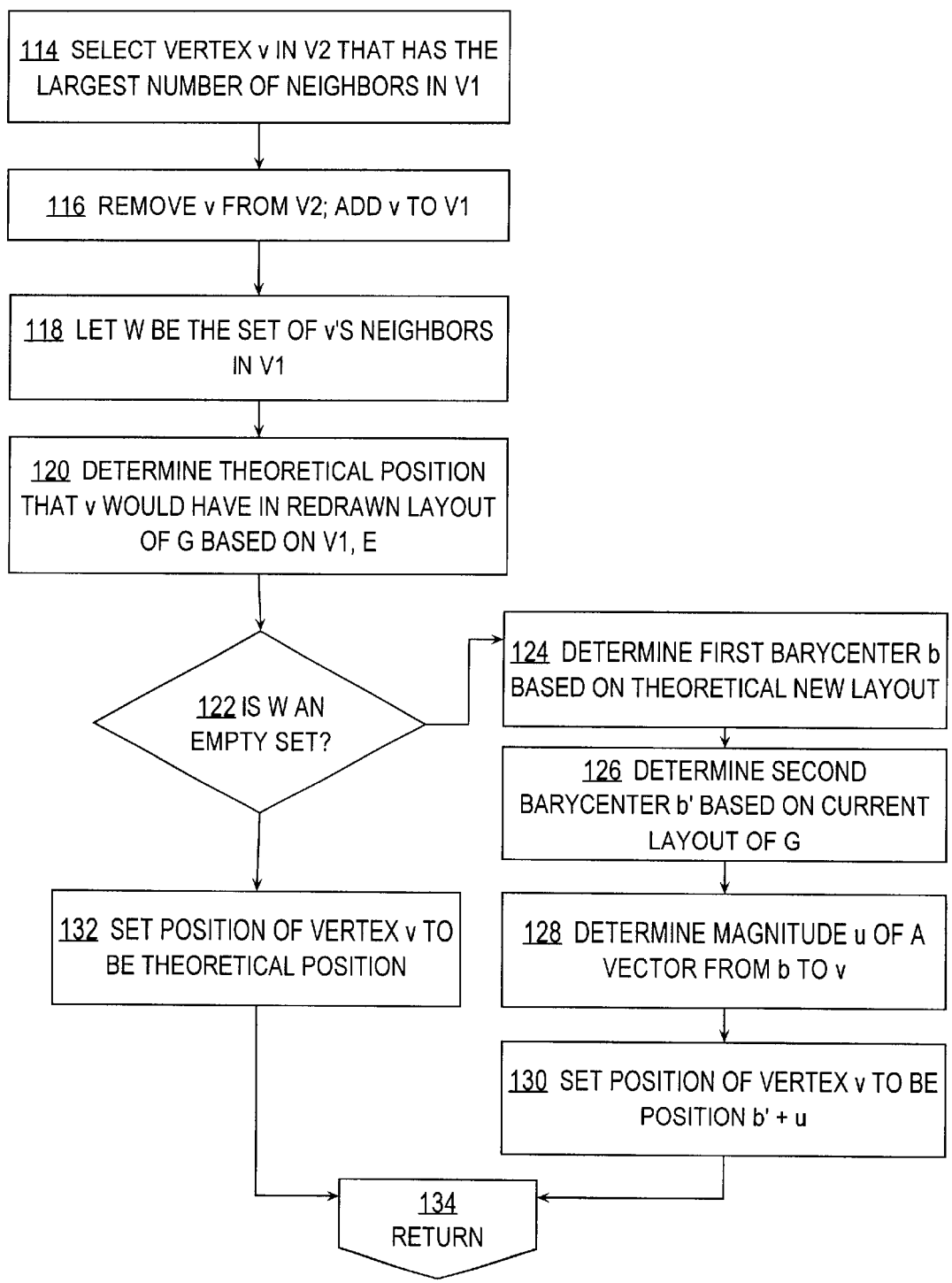
FIG. 1B is a flow diagram that illustrates further steps in the method of FIG. 1A.
Figure 2A:
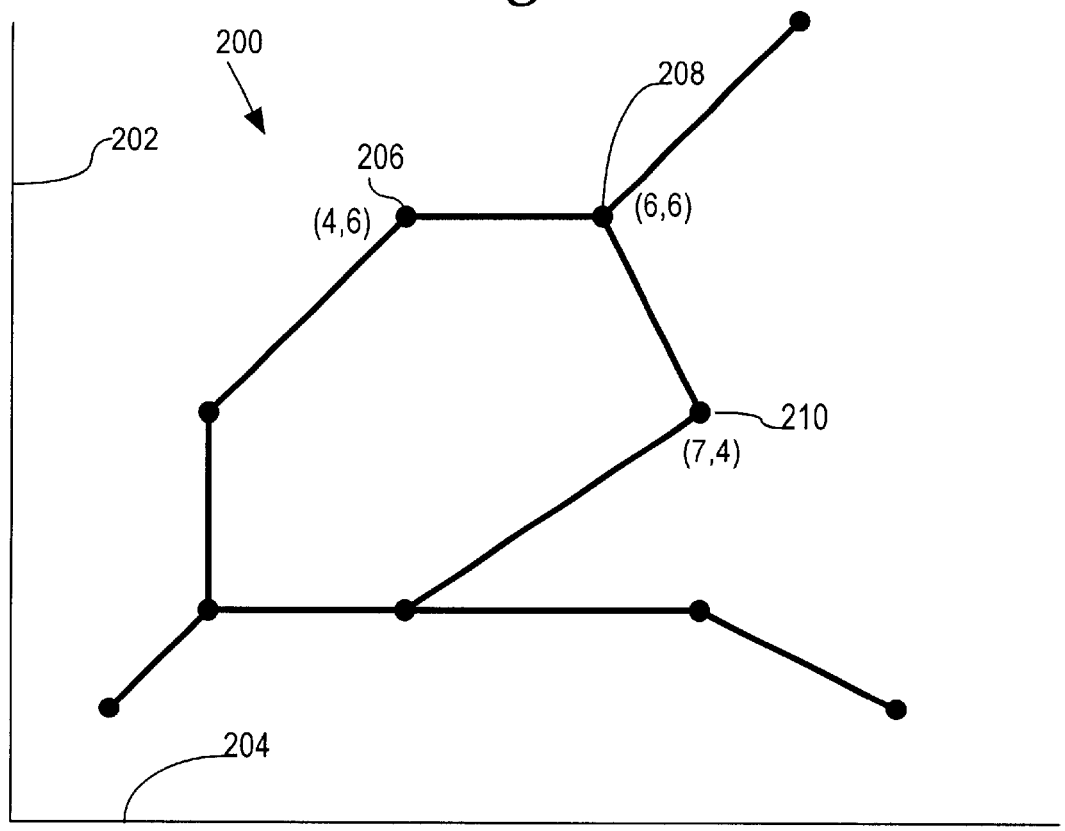
FIG. 2A is a diagram of an example line graph.
Figure 2B:
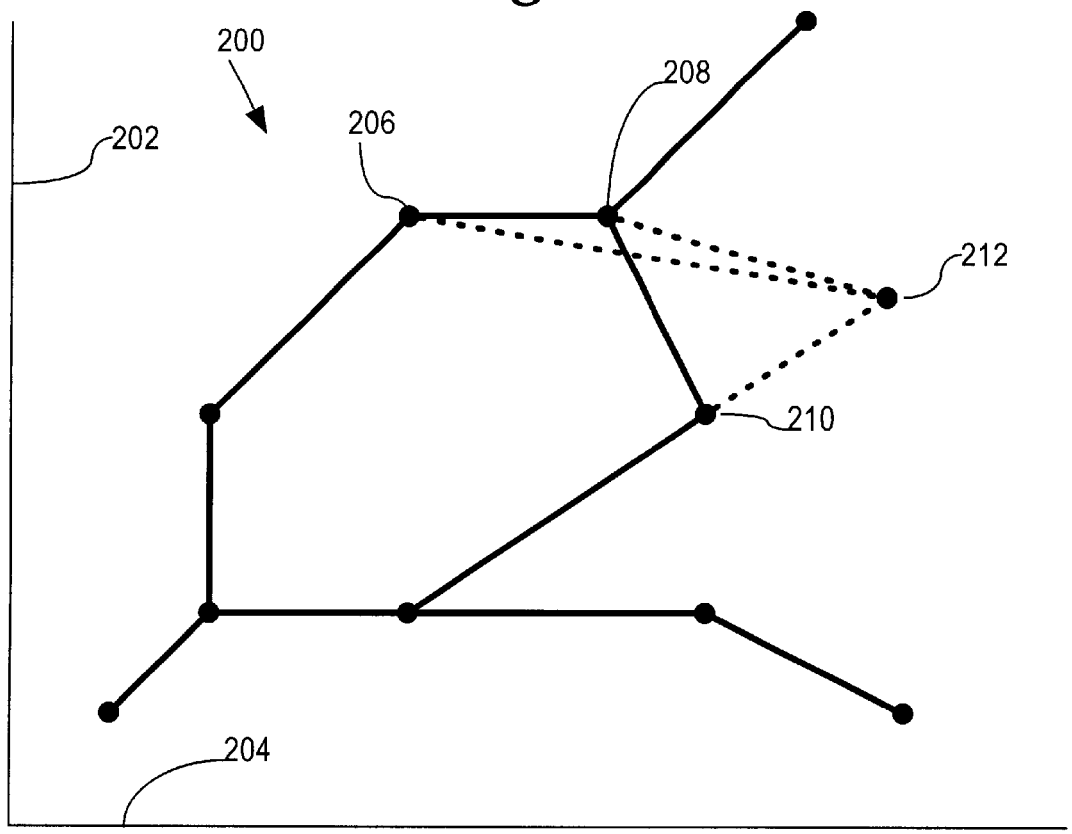
FIG. 2B is a diagram of the line graph of FIG. 2A illustrating an added node.
Figure 2C:
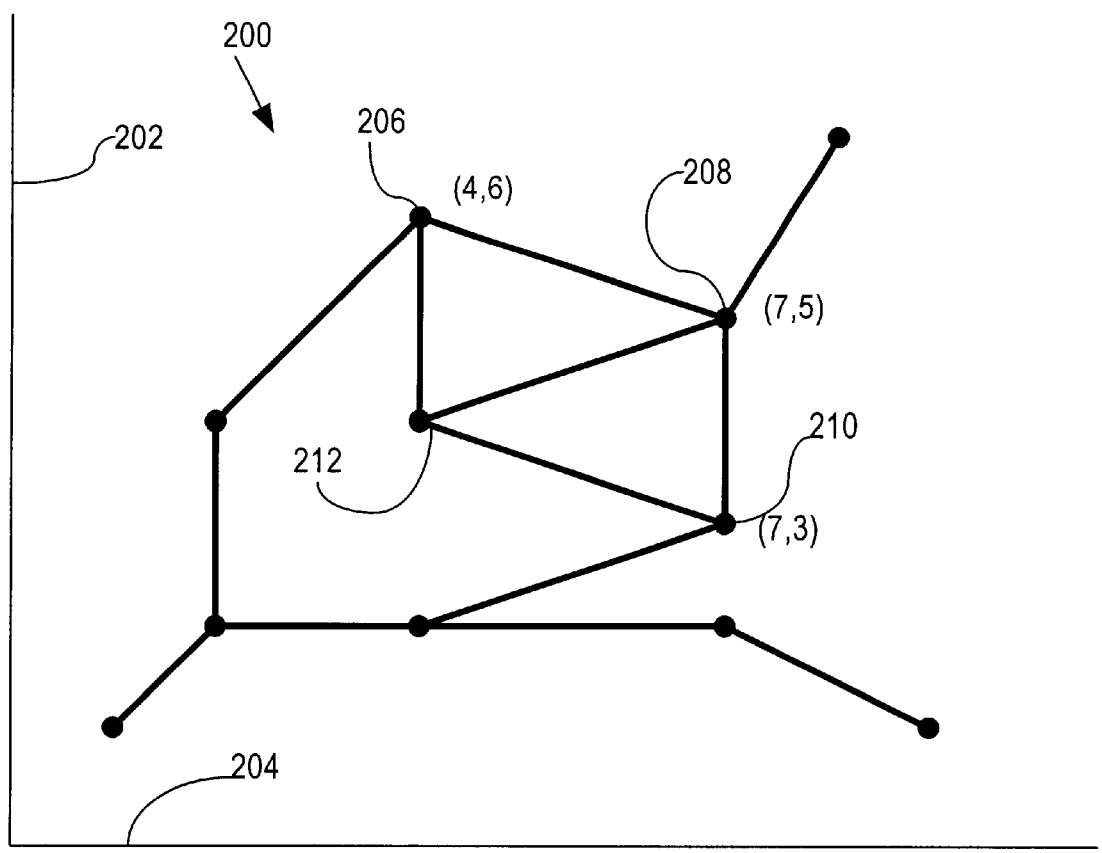
FIG. 2C is a diagram of the line graph of FIG. 2A illustrating a virtual revised topology.

FIG. 1A is a flow diagram that illustrates one embodiment of a method of drawing a line graph using incremental layout; FIG. 1B is a flow diagram that illustrates further steps in the method of FIG. 1A. For purposes of illustrating a clear example, the process of FIG. 1A, FIG. 1B is described with reference to FIG. 2A, FIG. 2B, FIG. 2C, and FIG. 2D. FIG. 2A is a diagram of an example line graph. FIG. 2B is a diagram of the line graph of FIG. 2A illustrating an added node; FIG. 2C is a diagram of the line graph of FIG. 2A illustrating a virtual revised topology; and FIG. 2D is a diagram of the line graph of FIG. 2A showing positioning of the added node.

In general, the process of FIG. 1A, FIG. 1B involves receiving a first graph and a set of new vertices and new edges for the first graph. The process successively removes one vertex from the set of new vertices, inserts the vertex in the existing vertices of the first graph, and assigns the vertex a new position as described herein. When all the new vertices are processed, a second graph may be used or drawn. The resulting graph has vertex positions that are positioned in a way that greatly reduces the amount of cognitive effort needed to relate the second graph to the first graph.

In one approach, the process of FIG. 1A, FIG. 1B can immediately add the new sets of edges E1, E2, such that edges E:=E1+E2, and grow the graph G(V1, E); by convention the function L(G) will ignore the edges in E that are missing a vertex in V1. Although designations such as V1, V2, E1, E2, v, u, b, and b' are used in the following description for convenience and clarity, such designations are not required in an embodiment, and any other suitable alternative designations may be used. Further, in certain embodiments such designations refer to or represent data values that are stored and transmitted in the form of electronic signals. In such embodiments, the signals may be manipulated by software, firmware or hardware instructions that control the operation of a general-purpose data processor to result in drawing a graph as described further herein.

Referring first to FIG. 1A, in block 102, a first graph is received, and is denoted herein as G(V1, E1), comprising a first set V1 of vertices and a first set E1 of edges. Receiving the first graph may comprise manually receiving vertex and edge information for a graph, calling an application program module and providing the vertex and edge information in the program call, or providing graph information through other computer-implemented mechanisms.

For example, referring now to FIG. 2A, assume that information defining a first graph 200 is received, comprising vertices 206, 208, 210. For clarity in the example of FIG. 2A, Cartesian graph axes 202, 204 are shown; however, in practical embodiments such axes may be omitted. Other vertices and edges are also shown in FIG. 2A, but are not referenced herein for clarity of the example. Vertices 206, 208, 210 have respective Cartesian coordinate positions (4,6), (6,6), and (7,4).

In block 104, a second set V2 of new vertices is received, and a second set E2 of new edges is received. Generally block 104 represents receiving one or more new vertices that are added to a graph by user action or by program action. For example, in a network management application, a device discovery routine may determine that one or more devices have been added to the topology of a network. In response to this discovery, the network management application may determine to re-draw a network topology graph that is shown in a user interface display. Block 104 may involve calling an appropriate program module to redraw a new graph, and providing the new vertices and edges with the program call.

Continuing with the example of FIG. 2A, and referring now to FIG. 2B, assume that block 104 involves receiving information specifying a new vertex 212 that has neighbors 206, 208, 210 and associated edges.

In block 106, the set of new edges E2 is added to the set of edges E1. In block 108, the process determines whether the set of new vertices V2 is an empty set. If not, then the process of FIG. 1B is performed, as indicated by block 110, in which particular vertices of V2 are processed. If V2 is empty, then all vertices have been processed, and the set of vertices V1 contains updated positions of all the vertices from V1. Accordingly, in block 112 the graph is used or redrawn with vertices V1 and edges E1. Block 112 may involve displaying the graph in a computer display, as part of a network topology display, and any other method of using or drawing the graph, including computer-assisted methods and other methods that are not computer assisted.

Referring now to FIG. 1B, in block 114 the process selects one vertex v from the set of new vertices V2 that has the largest number of neighboring vertices in V1. In this context, a second vertex is a "neighboring vertex" or "neighbor" of a first vertex when the first vertex and second vertex share an edge. The vertex with the largest number of neighbors in V1 is selected in order to maximize the influence of the initial graph layout over the resulting graph layout; this approach also maximizes preservation of the mental map. Other vertex selection methods also could be used. In block 116, the selected vertex v is removed from the set of new vertices V2, and added into the original set of vertices V1. Assume, for example, that vertex 212 of FIG. 2B is selected.

In block 118, a set W is established and has, as members, all v's neighbor vertices in V1. Block 118 may involve receiving a set of data identifying the members of W from an application or module that has invoked the process of FIG. 1A, FIG. 1B. In this approach, the neighbors of v essentially are known a priori when the process of FIG. 1A, FIG. 1B is invoked; this approach may be appropriate when a graph has a large number of vertices or nodes. Alternatively, the members of set W may be determined by comparing the coordinate values of v from V2 with all other coordinate values of V1 and determining which members of V1 are connected to v by an edge. In the example of FIG. 2B, the neighbors of vertex 212 are vertices 206, 208, 210.

In block 120, the process determines the theoretical position that v would have in a redrawn layout of the original graph G, if the redrawn layout is based on the updated vertex set V1 and edges E. In one embodiment, block 120 is performed by calling the existing function L(G) of a graph drawing software application, providing V1 and E as parameter values, to result in creating a second graph. While the second graph is constructed in memory using L(G), the second graph is not physically drawn in a computer display, but represents a theoretical graph layout that would result if the first graph was redrawn, with the second vertex set and second edge set added, using an existing aesthetic redrawing function.

For example, assume that if redrawn using L(G) to result in an aesthetic display, graph 200 would appear as in FIG. 2C. In the redrawn graph, vertex 212 is displayed in a new position, and the positions of vertices 208, 210 have changed to coordinate positions (7,5), (7,3) respectively. While this may result in an aesthetic display as determined by the logic of L(G), it also causes the positions of vertices 208, 210 to "jump" if redrawn. Therefore, in the approaches herein the graph of FIG. 2C is generated internally in terms of data values, but not displayed.

In block 1212, the process tests whether W is an empty set, which is equivalent to testing whether the present vertex v has no neighbors. If so, then in block 132, the position of v is set to be the same as the theoretical position it would have in the redrawn graph. In block 134, control returns to FIG. 1A.

However, if W has member vertices, then in block 124 the process determines a first barycenter b of the neighboring vertices, based on the theoretical layout. The value b is determined by separately summing the x and y coordinate values of each neighbor vertex in the theoretical layout, and dividing each sum by the number of members of W. This essentially yields a geometric center of the theoretical layout. Referring now to FIG. 2D, the barycenter of vertices 206, 208, 210 based on the theoretical layout of FIG. 2C is a point 216 at coordinates (6, 4.667).

Further, in block 126, a second barycenter b' is determined based on the layout of G as then-currently displayed. Thus, the coordinate values of all vertices that are neighbors of v are determined, summed, and divided by the number of members of W. This yields a separate barycenter value for the then-current layout. Referring again to FIG. 2D, a second barycenter based on the example of FIG. 2A is point 214 with coordinates (5.667, 5.334).

In block 128, the magnitude u of a vector from b to v is determined. In FIG. 2D, vector 218 is an example vector from the theoretical barycenter b to the theoretical vertex location 212A. In block 130, the coordinate values of v are set to be the coordinate values of a position equal to b'+u. Thus, adding vector 218 to current barycenter b 214 yields a final new vertex position 220. When graph 200 is ultimately used or redrawn, the new vertex is shown at position 220. Thereafter, at block 134, control returns to FIG. 1A, block 110.

The foregoing process can be visualized as follows. The process starts with a graph layout L(G) that has been computed by an existing automatic layout function. Assume that vertices V2 have been drawn but they are translucent, because they are only theoretically present. At this point, the graph layout may be considered aesthetically proper, because its layout has been determined by L(G). For any reason, the user decides to move some vertices of V1 around. As these vertices move, so do the barycenters for each neighborhood of translucent vertices in V2. The process herein enables each translucent vertex to follow its corresponding barycenter by maintaining a constant relative position.

This process produces layouts that satisfy both the mental map criterion and the adjustment need criterion for several reasons. There are three elements that are used to position v, namely barycenter b', the euclidean norm of vector u, and the direction of vector u. The point b' is the optimal point regarding mental map preservation because it is the only point that privileges none of v's neighbors concerning proximity. Thus, b' is the element that plays the role of satisfying the mental map criterion.

Positioning v at b' would not necessarily be satisfying to the user. For example, consider a vertex v that has a unique neighbor. In this case, the barycenter b' would coincide with the neighbor's position, and v would be superimposed over the neighbor. This is a degenerate case of extreme mental map preservation. As another example, consider a pair of incremental vertices v1, v2 that share the same set of neighbors. The barycenters of their neighbors, b1' and b2' would be equal, and therefore v1 and v2 would be superimposed over one another at b1'. Thus, vector u adds a discrimination aspect to the positioning, while remaining sufficiently small so not to eliminate the influence of b'. However, since graph drawing is subject to aesthetic criteria, the aesthetic function L(G) determines the value of the euclidean norm and direction of u. Accordingly, vector u enables the process to satisfy the adjustment need criterion.

Based on the foregoing, because b' is ideal in its role, and assuming L( ) is the perfect aesthetic function, then u also would appear to be perfect in its role. Therefore, in theory the user would never need to adjust the resulting layout. However, u cannot be deduced as perfect in its role, as described below. Nevertheless, the approach herein satisfies the main goal of meeting the mental map criterion, and also satisfies the secondary goal of meeting the adjustment criterion, which allows some degree of adjustment needs by the user.

In an alternative embodiment, a rotation may be applied to the redrawn position of v. For example, assume that a first graph is initially displayed as:

V1={v1=(−1, 0), v2=(1, 0), v3=(0, −2)} with barycenter b'=(0, −1), and that a new vertex v has appeared. Assume further that L(G(V1+{v}, E))=G(V1*, E), where + denotes a set union operation.

In this example,

V1*={v1=(−1, 0), v2=(1, 0), v3=(0, 2), v=(r, s)} with barycenter b=(0, 1).

The end result is that the vertex v will be positioned at (r, s−1)+(0, −1)=(r, s−2).

Thus, v maintains its vectorial distance, but ignores the largest possible rotation of 180 degrees performed by v3. Intuitively, v would be better positioned at (−r, 1−s)+(0, −1)=(−r, −s).

Therefore, the user probably will want to adjust v's position by maintaining the same distance to b', while rotating it around b'. Accordingly, in an alternative embodiment, the average rotation of v's neighborhood around the barycenter from the theoretical to the current layout is determined, and the same rotation is applied to vertex v.

When multiple incremental vertices share the same set of neighbors, they share the same angular offset to the desired position; as a result, a user may wish to select multiple incremental vertices and move them along. Further, when the multiple incremental vertices share common neighbors, then multi-selections are efficiently used to perform the bulk of adjustments. Indeed, the beneficial effects of the approach herein are more apparent when multiple incremental vertices appear at the same time, because such vertices statistically form connected sub-graphs within themselves, and L(G) can perform an efficient aesthetic re-drawing over the sub-graphs because they have not been altered by the user. Therefore, the approaches herein can be used to make adjustments by moving aesthetic fragments around, again based on the assumption that function L( ) is perfect.

Particular embodiments may be used in displaying a network topology map in a network management application. For example, a specific embodiment may be used in managing network switches, routers, and other devices. The process can be invoked by a network management application at various times, for example, after a discovery element of the network management application has discovered one or more devices that have been introduced into the network since the last discovery cycle.

3.0 Implementation Mechanisms—Hardware Overview

Figure 3:
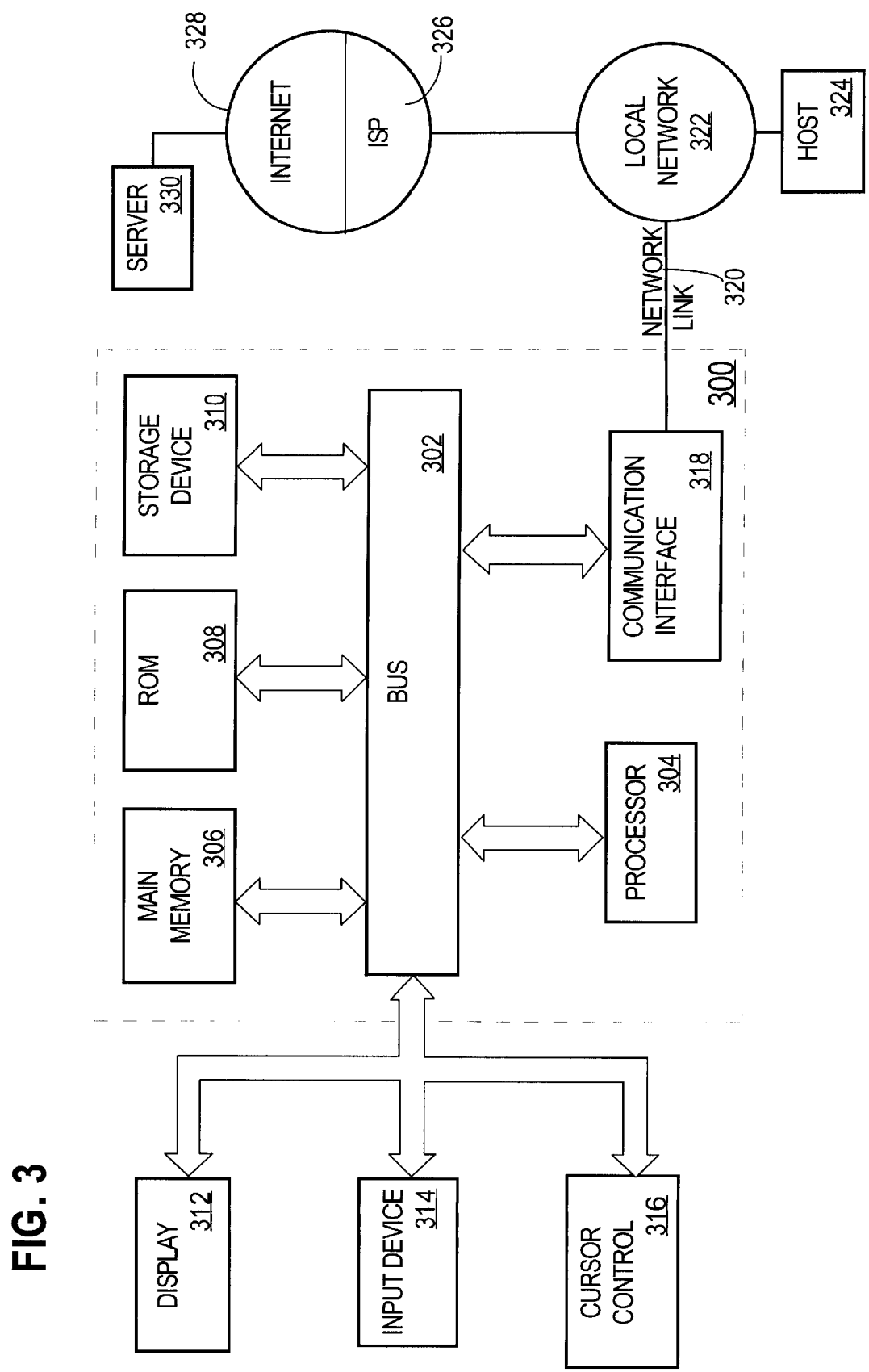
FIG. 3 is a block diagram that illustrates a computer system upon which an embodiment may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory ("RAM") or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory ("ROM") 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube ("CRT"), for displaying information to a computer user. An input device 314, including alphanumeric and other keys, is coupled to bus 302 for communicating information and command selections to processor 304. Another type of user input device is cursor control 316, such as a mouse, trackball, stylus, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for drawing a line graph. According to one embodiment of the invention, drawing a line graph is provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector can receive the data carried in the infrared signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322.

For example, communication interface 318 may be an integrated services digital network ("ISDN") card or a modem to provide a data communication connection to a corresponding type of telephone line. As another example, communication interface 318 may be a local area network ("LAN") card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider ("ISP") 326. ISP 326 in turn provides data communication services through the worldwide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 3281, ISP 326, local network 322 and communication interface 318. In accordance with the invention, one such downloaded application provides for drawing a line graph as described herein.

Processor 304 may execute the received code as it is received, and/or stored in storage device 310, or other non-volatile storage for later execution. In this manner, computer system 300 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of drawing a line graph, the method comprising the steps of:
   receiving information defining a first graph comprising a first vertex set and a first edge set;
   receiving a second vertex set and a second edge set;
   adding the second edge set to the first edge set;
   creating a second graph based on the first vertex set and the first edge set;
   for each vertex in the second vertex set:
     determining one or more neighboring vertices;
     determining a first barycenter based on positions of the neighboring vertices in the second graph;
     determining a second barycenter based on positions of the neighboring vertices in the first graph;
     determining a vector directed from the first barycenter to the vertex in the second graph;
     modifying coordinates of the vertex in the first graph to a final position equal to a sum of the vector and the second barycenter; and
     adding the vertex with modified coordinates to the first vertex set.

2. A method as recited in claim 1, further comprising the steps of manually drawing the first graph before the modifying step and re-drawing the first graph after the modifying step.

3. A method as recited in claim 1, wherein each step is computer-implemented, and further comprising the steps of causing a computer to display the first graph on a computer display, and causing the computer to re-displaying the first graph after the modifying step.

4. A method as recited in claim 1, wherein each of the vertices represents a device in a network, and further comprising the step of displaying the first graph in a user interface display of a network management application.

5. A method as recited in claim 1, further comprising the steps of:
   determining a rotation of the vertex in the second graph as compared to the first graph;
   applying an inverse rotation to the final position.

6. A method as recited in claim 1, further comprising the steps of:
   determining an average rotation of the neighboring vertices around the first barycenter when the second graph is compared to the first graph;
   applying the average rotation to the final position.

7. A method as recited in claim 1, wherein each of the edges comprises a polyline.

8. A method as recited in claim 1, wherein the step of creating the second graph comprises the step of calling an automatic layout function of a graph drawing computer software application.

9. A method as recited in claim 1, wherein the step of creating the second graph comprises the step of calling an automatic layout function of a graph drawing computer software application without drawing the second graph in a computer display.

10. A method as recited in claim 1, wherein the first graph is a loosely configurable graph.

11. A method as recited in claim 1, wherein the first graph is a constrained configuration graph.

12. A method as recited in claim 1, wherein the step of creating the second graph comprises creating a virtual graph in computer memory without displaying the virtual graph.

13. A method of generating and displaying a graphical network topology display, the method comprising the steps of:
   receiving information defining a first network topology graph comprising a first vertex set and a first edge set, wherein the first vertex set represents network devices in a network and the first edge set represents links among the network devices;
   receiving a second vertex set and a second edge set;
   adding the second edge set to the first edge set;
   creating a second virtual graph based on the first vertex set and the first edge set;
   for each vertex in the second vertex set:
     determining one or more neighboring vertices;
     determining a first barycenter based on positions of the neighboring vertices in the second graph;
     determining a second barycenter based on positions of the neighboring vertices in the first network topology graph;
     determining a vector directed from the first barycenter to the vertex in the second graph; and modifying coordinates of the vertex in the first graph to a final position equal to a sum of the vector and the second barycenter; and re-displaying the first network topology graph.

14. A method as recited in claim 13, wherein the re-displaying step comprises re-displaying the second graph in a user interface display of a network management application.

15. A method as recited in claim 13, further comprising the steps of:
   determining a rotation of the vertex in the second graph as compared to the first network topology graph;
   applying an inverse rotation to the final position.

16. A method as recited in claim 13, further comprising the steps of:
   determining an average rotation of the neighboring vertices around the first barycenter when the second graph is compared to the first network topology graph;
   applying the average rotation to the final position.

17. A method as recited in claim 13, wherein each of the edges comprises a polyline.

18. A method as recited in claim 13, wherein the step of creating the second graph comprises the step of calling an automatic layout function of a graph drawing computer software application.

19. A method as recited in claim 13, wherein the step of creating the second graph comprises the step of calling an automatic layout function of a graph drawing computer software application without drawing the second graph.

20. A method as recited in claim 13, wherein the first graph is a loosely configurable graph.

21. A method as recited in claim 13, wherein the first graph is a constrained configuration graph.

22. A method as recited in claim 13, wherein the step of creating the second graph comprises creating a virtual graph in computer memory without displaying the virtual graph.

23. A computer-readable medium carrying one or more sequences of instructions for drawing a line graph, which instructions, when executed by one or more processors, cause the one or more processors to carry out the steps of:
   receiving information defining a first graph comprising a first vertex set and a first edge set;
   receiving a second vertex set and a second edge set;
   adding the second edge set to the first edge set;
   creating a second graph based on the first vertex set and the first edge set;
   for each vertex in the second vertex set:
      determining one or more neighboring vertices;
      determining a first barycenter based on positions of the neighboring vertices in the second graph;
      determining a second barycenter based on positions of the neighboring vertices in the first graph;
      determining a vector directed from the first barycenter to the vertex in the second graph; and
      modifying coordinates of the vertex in the first graph to a final position equal to a sum of the vector and the second barycenter.

24. A computer-readable medium as recited in claim 23, further comprising the steps of manually drawing the first graph before the modifying step and re-drawing the first graph after the modifying step.

25. A computer-readable medium as recited in claim 23, wherein each step is computer-implemented, and further comprising the steps of causing a computer to display the first graph on a computer display, and causing the computer to re-displaying the first graph after the modifying step.

26. A computer-readable medium as recited in claim 23, wherein each of the vertices represents a device in a network, and further comprising the step of displaying the first graph in a user interface display of a network management application.

27. A computer-readable medium as recited in claim 23, further comprising the steps of:
   determining a rotation of the vertex in the second graph as compared to the first graph;
   applying an inverse rotation to the final position.

28. A computer-readable medium as recited in claim 23, further comprising the steps of:
   determining an average rotation of the neighboring vertices around the first barycenter when the second graph is compared to the first graph;
   applying the average rotation to the final position.

29. A computer-readable medium as recited in claim 23, wherein each of the edges comprises a polyline.

30. A computer-readable medium as recited in claim 23, wherein the step of creating the second graph comprises the step of calling an automatic layout function of a graph drawing computer software application.

31. A computer-readable medium as recited in claim 23, wherein the step of creating the second graph comprises the step of calling an automatic layout function of a graph drawing computer software application without drawing the second graph in a computer display.

32. A computer-readable medium as recited in claim 23, wherein the first graph is a loosely configurable graph.

33. A computer-readable medium as recited in claim 23, wherein the first graph is a constrained configuration graph.

34. A computer-readable medium as recited in claim 23, wherein the step of creating the second graph comprises creating a virtual graph in computer memory without displaying the virtual graph.

35. An apparatus for drawing a line graph, comprising:
   means for receiving information defining a first graph comprising a first vertex set and a first edge set;
   means for receiving a second vertex set and a second edge set;
   means for adding the second edge set to the first edge set;
   means for creating a second graph based on the first vertex set and the first edge set;
   means for performing the following steps for each vertex in the second vertex set:
      determining one or more neighboring vertices;
      determining a first barycenter based on positions of the neighboring vertices in the second graph;
      determining a second barycenter based on positions of the neighboring vertices in the first graph;
      determining a vector directed from the first barycenter to the vertex in the second graph; and
      modifying coordinates of the vertex in the first graph to a final position equal to a sum of the vector and the second barycenter.

36. An apparatus as recited in claim 35, further comprising the steps of manually drawing the first graph before the modifying step and re-drawing the first graph after the modifying step.

37. An apparatus as recited in claim 35, wherein each step is computer-implemented, and further comprising the steps of causing a computer to display the first graph on a computer display, and causing the computer to re-displaying the first graph after the modifying step.

38. An apparatus as recited in claim 35, wherein each of the vertices represents a device in a network, and further comprising the step of displaying the first graph in a user interface display of a network management application.

39. An apparatus as recited in claim 35, further comprising the steps of:

determining a rotation of the vertex in the second graph as compared to the first graph;

applying an inverse rotation to the final position.

40. An apparatus as recited in claim 35, further comprising the steps of:

determining an average rotation of the neighboring vertices around the first barycenter when the second graph is compared to the first graph;

applying the average rotation to the final position.

41. An apparatus as recited in claim 35, wherein each of the edges comprises a polyline.

42. An apparatus as recited in claim 35, wherein the step of creating the second graph comprises the step of calling an automatic layout function of a graph drawing computer software application.

43. An apparatus as recited in claim 35, wherein the step of creating the second graph comprises the step of calling an automatic layout function of a graph drawing computer software application without drawing the second graph in a computer display.

44. An apparatus as recited in claim 35, wherein the first graph is a loosely configurable graph.

45. An apparatus as recited in claim 35, wherein the first graph is a constrained configuration graph.

46. An apparatus as recited in claim 35, wherein the step of creating the second graph comprises creating a virtual graph in computer memory without displaying the virtual graph.

47. An apparatus for drawing a line graph, comprising:

a network interface that is coupled to the data network for receiving one or more packet flows therefrom;

a processor;

one or more stored sequences of instructions which, when executed by the processor, cause the processor to carry out the steps of:

receiving information defining a first graph comprising a first vertex set and a first edge set;

receiving a second vertex set and a second edge set;

adding the second edge set to the first edge set;

creating a second graph based on the first vertex set and the first edge set;

for each vertex in the second vertex set:

determining one or more neighboring vertices;

determining a first barycenter based on positions of the neighboring vertices in the second graph;

determining a second barycenter based on positions of the neighboring vertices in the first graph;

determining a vector directed from the first barycenter to the vertex in the second graph; and modifying coordinates of the vertex in the first graph to a final position equal to a sum of the vector and the second barycenter.

48. An apparatus as recited in claim 47, further comprising the steps of manually drawing the first graph before the modifying step and re-drawing the first graph after the modifying step.

49. An apparatus as recited in claim 47, wherein each step is computer-implemented, and further comprising the steps of causing a computer to display the first graph on a computer display, and causing the computer to re-displaying the first graph after the modifying step.

50. An apparatus as recited in claim 47, wherein each of the vertices represents a device in a network, and further comprising the step of displaying the first graph in a user interface display of a network management application.

51. An apparatus as recited in claim 47, further comprising the steps of:

determining a rotation of the vertex in the second graph as compared to the first graph;

applying an inverse rotation to the final position.

52. An apparatus as recited in claim 47, further comprising the steps of:

determining an average rotation of the neighboring vertices around the first barycenter when the second graph is compared to the first graph;

applying the average rotation to the final position.

53. An apparatus as recited in claim 47, wherein each of the edges comprises a polyline.

54. An apparatus as recited in claim 47, wherein the step of creating the second graph comprises the step of calling an automatic layout function of a graph drawing computer software application.

55. An apparatus as recited in claim 47, wherein the step of creating the second graph comprises the step of calling an automatic layout function of a graph drawing computer software application without drawing the second graph in a computer display.

56. An apparatus as recited in claim 47, wherein the first graph is a loosely configurable graph.

57. An apparatus as recited in claim 47, wherein the first graph is a constrained configuration graph.

58. An apparatus as recited in claim 47, wherein the step of creating the second graph comprises creating a virtual graph in computer memory without displaying the virtual graph.

* * * * *